(12) United States Patent
Avkd et al.

(10) Patent No.: US 10,943,073 B2
(45) Date of Patent: *Mar. 9, 2021

(54) DYNAMIC CANDIDATE EXPECTATION PREDICTION

(71) Applicant: International Business Machines Corporation, Armonk, NY (US)

(72) Inventors: Sivakumar Avkd, Visakhapatnam (IN); Ravi T. Vadlamani, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 98 days.

This patent is subject to a terminal disclaimer.

(21) Appl. No.: 15/885,981

(22) Filed: Feb. 1, 2018

(65) Prior Publication Data

US 2018/0157645 A1 Jun. 7, 2018

Related U.S. Application Data

(63) Continuation of application No. 15/266,209, filed on Sep. 15, 2016, now Pat. No. 10,657,331.

(51) Int. Cl.
*G06Q 10/10* (2012.01)
*G06F 40/40* (2020.01)
(Continued)

(52) U.S. Cl.
CPC .............. *G06F 40/40* (2020.01); *G06F 40/20* (2020.01); *G06N 20/00* (2019.01);
(Continued)

(58) Field of Classification Search
CPC combination set(s) only.
See application file for complete search history.

(56) References Cited

U.S. PATENT DOCUMENTS 7,324,954 B2 1/2008 Calderaro et al.
7,367,808 B1 5/2008 Frank et al.
(Continued)

OTHER PUBLICATIONS

MRINetwork, Recruiter Sentiment Study, 2013 2nd half, MRINetwork.com/RecruiterSentiment, http://www.mrinetwork.com/recruiter-sentiment-study/, 13 pgs., © 2013 Management Recruiters International, Inc.
(Continued)

*Primary Examiner* — Gabrielle A McCormick
*Assistant Examiner* — Maame Ofori-Awuah
(74) *Attorney, Agent, or Firm* — Mark Bergner (57) ABSTRACT

A computer system may receive a first set of bundled information. The computer system may have a processor and a memory storing one or more natural language processing modules. The computer system, using a natural language processing module, may ingest the first set of bundled information. The computer system may generate a first set and a second set of categories. The computer system may generate one or more models. The computer system may receive a set of input characteristics. The computer system may select a model based on the input characteristics. The computer system may rank one or more correlations using the selected model. The computer system may output a display of the one or more correlations on a graphical user interface.

6 Claims, 5 Drawing Sheets

(51) Int. Cl.
*G06N 20/00* (2019.01)
*G06F 40/20* (2020.01)
*G06F 40/205* (2020.01)

(52) U.S. Cl.
CPC ..... *G06Q 10/1053* (2013.01); *G06Q 10/1057* (2013.01); *G06F 40/205* (2020.01)

(56) References Cited

U.S. PATENT DOCUMENTS

| | | | |
|---|---|---|---|
| 7,672,861 | B2 | 3/2010 | Al-Otaibi et al. |
| 8,290,807 | B2 | 10/2012 | Al-Otaibi et al. |
| 9,509,846 | B1* | 11/2016 | Jandwani ................ H04L 65/80 |
| 10,614,799 | B2 | 4/2020 | Kennewick, Jr. et al. |
| 2008/0208671 | A1* | 8/2008 | Ehrlich .......... G06Q 10/063112 705/7.14 |
| 2011/0307303 | A1* | 12/2011 | Dutta ................ G06F 16/2465 705/7.42 |
| 2012/0226623 | A1 | 9/2012 | Jurney et al. |
| 2012/0283954 | A1* | 11/2012 | Bray ................ G01N 33/6848 702/19 |
| 2013/0066797 | A1 | 3/2013 | Myers et al. |
| 2013/0297373 | A1 | 11/2013 | Proux |
| 2014/0032253 | A1 | 1/2014 | April et al. |
| 2014/0136541 | A1* | 5/2014 | Farahat ................ G06F 16/958 707/740 |
| 2014/0156581 | A1* | 6/2014 | Jayaraman ............... G06N 5/02 706/46 |
| 2016/0071038 | A1 | 3/2016 | Puttaswamy et al. |
| 2016/0098393 | A1 | 4/2016 | Hebert |
| 2016/0232160 | A1 | 8/2016 | Buhrmann et al. |
| 2016/0253679 | A1* | 9/2016 | Venkatraman ..... G06Q 30/0185 705/310 |
| 2017/0039293 | A1* | 2/2017 | Kummamuru ...... G06F 16/3329 |
| 2017/0235824 | A1 | 8/2017 | Liu |
| 2019/0179890 | A1 | 6/2019 | Evermann |

OTHER PUBLICATIONS

Szur, S. "The Importance of Hiring Top Talent," http://www.harrisongroup.com/2015/01/19/the-importance-of-hiring-top-talent/, 4 pgs., Jan. 19, 2015, printed Jun. 23, 2016.

Avkd, et al., "Dynamic Candidate Expectation Prediction," U.S. Appl. No. 15/266,209, filed Sep. 15, 2016.

List of IBM Patents or Patent Applications Treated as Related, Jan. 31, 2018, 2 pgs.

* cited by examiner

DYNAMIC CANDIDATE EXPECTATION PREDICTION

BACKGROUND

The present disclosure relates generally to the field of natural language processing and machine learning, and more specifically to identifying and updating operational trends.

It is common for a user to want to attract or retain a particular type of candidate. The user may have unstructured information that may be associated with the particular type of candidate. The user may have no way to sort, interpret, or correlation the unstructured information in order to use the information to attract or retain the particular type of candidate.

SUMMARY

Embodiments of the present invention disclose a method, system, and computer program product for generating tailored offers and/or packages for candidates based on correlations between operational information and candidate information. A computer system may receive a first set of bundled information. The computer system may have a processor and a memory storing one or more natural language processing modules. The computer system, using a natural language processing module, may ingest the first set of bundled information. The computer system may generate a first set and a second set of categories. The computer system may generate one or more models. The computer system may receive a set of input characteristics. The computer system may select a model based on the input characteristics. The computer system may rank one or more correlations using the selected model. The computer system may output a display of the one or more correlations on a graphical user interface.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of present disclosure relate generally to the field of natural language processing and machine learning, and more specifically to identifying and updating operational trends. While the present disclosure is not necessarily limited to such applications, various aspects of the disclosure may be appreciated through a discussion of various examples using this context.

A computer system may receive a first set of bundled information (e.g., one or more surveys, website posts, textual data, etc.). The computer system may have a processor and a memory storing one or more natural language processing modules. The computer system, using a natural language processing module, may ingest the first set of bundled information. The computer system may generate a first set and a second set of categories. The computer system may generate one or more models. The computer system may receive a set of input characteristics. The computer system may select a model based on the input characteristics. The computer system may rank one or more correlations using the selected model. The computer system may output a display of the one or more correlations on a graphical user interface (GUI).

For example, a computer system may receive a survey (e.g., unstructured information in this example, because it is not a predefined model such as a table) about how often the average computer engineer works a week. A natural language processing module in the computer system may ingest and parse the survey into a first set of operational information (e.g., information specific to a company, organization, entity, etc.) categories: 1) less than 40 hours a week and 2) more than 40 hours a week. The computer system may additionally identify the age of the computer engineers surveyed and parse the survey into a second set of candidate information (e.g., information specific to an employee, a person, etc.) categories: 1) computer engineers below 30 years old and 2) computer engineers above 30 years old. The computer system may determine a correlation that computer engineers below 30 years old work more than 40 hours a week and that computer engineers above 30 years old work less than 40 hours a week and generate a model associated with the correlation.

The computer system may then receive a query from a user for information about recent computer engineering graduates (e.g., the set of input characteristics). The computer system may be programmed to recognize that most recent graduates are in their 20s and select the model aforementioned that details that computer engineers below 30 years old work more than 40 hours a week. In some embodiments, the computer system may have more than one correlation in the model and rank the correlations using the selected model.

Following the example above, the computer system may have also determined that a correlation in the selected model may indicate that computer engineering graduates prefer to work remotely. The computer system may rank the correlations between computer engineers below 30 years old and working more than 40 hours a week below the correlation about computer engineering graduates preferring to work remotely. The computer system may rank the remote working correlation higher than the 40 hours a week correlation because the computer system may have determined that more computer science engineers accept positions with remote working capabilities than a chance for hours to work. The computer system may output a list of the ranked correlations that may allow the user to determine whether or not to offer a candidate a position that allows for remote working.

In some embodiments, the first set of bundled information may be unstructured. In some embodiments, the computer system may generate the first and second set of categories by parsing the first set of bundled information into a set of operational information categories and a set of candidate information categories. The computer system may also structure the operational information and candidate information in a bipartite graph.

For example, the computer system may receive information from a PDF file (e.g., unstructured information). The PDF file may be a report on an organization's employee morale. The computer system may parse the information, using a natural language processing module, into two sets of categories. The first set of categories may be words associated with the organization (e.g., the set of operational information categories) and the second set of categories may be words associated with the type of employee (e.g., the set of candidate information categories). The computer system may place in the words "hours worked, salary, and sick pay" into the set of words (e.g., categories) associated with the organization and the words "banker, has children, and happy" into the set of words (e.g., categories) associated with the words associated with the type of employee. The computer system may structure the set of words associated with the organization into one column of a bipartite graph and the set of words associated with the type of candidate in a second column of the bipartite graph.

In some embodiments, when ingesting the first bundled information, the computer system may parse and structure the first bundled information by placing the information in a database table. In some embodiments, the computer system may parse the unstructured information by any level of granularity. For example, the computer system may receive salary information. The computer system may parse the information into categories of salary to the nearest cent (e.g., $32,103.56), to the nearest dollar ($32,103), to the nearest hundred dollar ($32,100), etc. In some embodiments, the computer system may parse the unstructured information into categories selected by a user.

In some embodiments, the first set of bundled information may be structured, semi-structured, unstructured, or some combination thereof. For example, the bundled information may include one or more unstructured surveys, one or more semi-structured surveys, and structured data retrieved from a database (e.g., labor statistics retrieved using APIs from a government report or database). In some embodiments, the computer system may parse the first set of bundled information and generate a set of operational information categories (e.g., work-life balance, salary, numbers of hours worked, vacation days, benefits, etc.) and a set of candidate information categories (e.g., age, education, family, etc.). The computer system may also structure the one or more categories (e.g., place the operational and candidate information categories into a database table, bipartite graph, etc.).

For example, a computer system may receive a blog entry (e.g., unstructured data). The blog entry may include a first set of bundled information (e.g., Pete is a single banker, who likes working remotely). A natural language processing module in the computer system may ingest the blog entry and parse the blog entry into a set of operational information categories and a set of candidate information categories (e.g., operational information categories: banker, remote working; and candidate information categories: single). The natural language processing module may structure the parsed operational and candidate information (e.g., put into a database table, etc.) In some embodiments, the bundled information may come from a particular work organization, or publicly accessible information (e.g., labor statistics, etc.).

In some embodiments, the computer system may generate the one or more models by adding the first and second sets of categories to a bipartite graph. The computer system may also identify, using the bipartite graph, the one or more correlations between the first and second sets of categories. The computer system may generate a first model that includes at least one of the one or more correlations.

For example, the computer system may have a set of operational information categories (e.g., salary, time worked a week, work/life balance, etc.) and a set of candidate information categories (e.g., employee age, education, etc.). The computer system may put the set of operational information categories into a first column of a bipartite graph and the set of candidate information categories into a second column of the bipartite graph. The computer system may use the bipartite graph to generate correlations between the set of operational information categories and the set of candidate information categories (e.g., more salary to higher older employees, less time worked a week to higher educated employees, etc.). The computer system may generate a model for higher educated employees detailing that a higher educated employee is likely to work less hours a week, be paid more than a lower educated employee, etc. The model may be useful to a user if the user is trying to identify the expectations (e.g., salary, days off, etc.) of a particular candidate (e.g., higher educated employee, etc.)

In some embodiments, input characteristics may be a second set of bundled information (e.g., a second set of operational information categories and/or a second set of candidate information categories). In some embodiments, when receiving the set of input characteristics, the computer system may receive the second set of bundled information and combine the second set of bundled information with the first set of bundled information. The computer system may then identify a first model associated with the second set of bundled information. In some embodiments, the input characteristics may be information sought after by a user.

For example, a user may input information seeking correlations between mechanics and a mechanic's average workweek (e.g., lunch breaks, over time, time into work, time out of work, etc.). The computer system may receive the information as a bundle asking about mechanics and a mechanic's average workweek. The computer system may parse the information into two sets of categories. The first set of categories associated with "mechanics" and the second set of categories associated with "mechanic's average workweek." The computer system may combine the first and second set of categories to an existing database of sets of categories associated with mechanics and their respective workweeks.

In some embodiments, when selecting the model based on the input characteristics, the computer system may generate, from the input characteristics, a third set and a fourth set of categories. The computer system may also determine whether at least one category of the first and second set of categories matches at least one category of the third and fourth set of categories.

Following the example above, as the computer system is combining the first and second sets of categories to the existing database. The computer system may also search the database for categories from the first set of bundled information that matches the categories of "mechanic" (e.g., a third set of categories) and "mechanic's average workweek (e.g., a fourth set of categories). The computer system may pull an existing model associated with the matching categories (e.g., that mechanics take an average lunch break of 20 minutes and are content with that amount of time, etc.) and display the model to a user.

In some embodiments, when outputting a display of the one or more correlations on the GUI, the computer system may generate a bar graph to indicate the strength of the one or more correlations as they relate to the input characteristics. For example, the computer system may receive information detailing that a company that offers 10 vacation days a year has retention of 90% of their Ivy League graduate employees. The computer system may additionally identify (e.g., by accessing information stored in memory that is associated to Ivy League graduates) that a prior correlation, from a model including Ivy League graduates, was determined that Ivy League graduates (e.g., Ivy league graduates being the matching category for both the first and second sets of bundled information) have a 60% retention rate if given a salary above $100,000.

The computer system may determine (e.g., by comparing the retention rates) that offering more than 10 vacation days a year may lead to more Ivy League graduates accepting job offers than Ivy League graduates being offered above $100,000 for a job offer. The computer system may then update the rankings of the correlations, putting the correlation between greater than 10 days vacation above a $100,000 job offer. The computer system may also display the updated, ranked correlations to a user as a bar graph indicating that a correlation between a greater number of vacation days is stronger at attracting Ivy League graduates than a high salary.

In some embodiments, when outputting a display of the one or more correlations on the GUI, the computer system may generate a heat map to indicate the strength of the one or more correlations as they relate to the input characteristics. For example, the computer system may receive information detailing that a company has 80% of job offers for chemical engineers rejected. The computer system may also receive information that the company offers a salary of less than $45,000. The computer system may identify a prior correlation, from a model including chemical engineers, that details that chemical engineers (e.g., the associated category for both the first and second bundled information) are likely to accept job offers if full medical benefits are included. The computer system may additionally determine that there is a new correlation between high rejection rates and a less than $45,000 salary.

The computer system may then rank the salary correlation lower than the full medical benefit correlation because the salary correlation is a negative correlation (e.g., it does not detail the best way to have a chemical engineer accept a job, the full medical benefit correlation is the best way to attract a chemical engineer). The computer system may display the update rankings to a user in the form of a heat map that has a range of colors from green to yellow to red. With green indicating that full medical benefits are sought after by chemical engineers, red indicating that salaries less than $45,000 are not sought after by chemical engineers, and yellow indicating the attractiveness of salaries above and below $45,000 and medical benefits less than full. In some embodiments, the user may use the heat map to tailor a package to attract chemical engineers. In some embodiments, the computer system may create a feedback loop (e.g., machine learning) and continually update the model every time a new set of bundled information is inputted (e.g., the computer system may be constantly learning new patterns and correlations).

In some embodiments, the computer system may combine categories to tailor a package for a candidate. Following the above example, the computer system may determine that the best tailored package may a package with a $45,000 and full medical benefits. In some embodiments, the computer system may be programmed to identify a minimum offer required to attract or retain a particular candidate. Again following the example above the computer system may determine that a minimum package offer may be a $40,000 salary with full medical benefits.

In some embodiments, when the computer system receives a second set of bundled information, the computer system may determine whether one or more new correlations exist between at least one category of the second set of bundled information and at least one category of the first set of bundled information. In some embodiments, the second set of bundled information may be added to the first set of bundled information. In some embodiments, the first set of bundled information may be eliminated in response to the computer system adding the second set of bundled information. In some embodiments, the second set of bundled information may be weighted because the newer information.

In some embodiments, a user may input a set of operational information categories into the computer system (e.g., as a query). The computer system may identify each correlation associated with the set of operational information categories. The computer system may then generate a list of candidate information correlated to accepting positions associated with the set of operational information.

For example, a user may input information into a computer system that the user's organization can offer $32,000 a year with full dental benefits (e.g., the set of operational information categories). The computer system may identify, from a database, a model with each correlation that details which candidates are most like to accept an offer for $32,000 a year with full dental benefits. The computer system may output the list of candidates willing to accept the offer (e.g., dental hygienists, bankers, etc.). In some embodiments, the user may additionally query which type of candidate they are looking for (e.g., a banker to accept the offer). In some embodiments, if the type of candidate is given, the computer system may output which level of candidate (e.g., a mid-level banker with 2 years experience, etc.) may accept the offer.

In some embodiments, the computer system may output one or more candidate profiles, and a score indicating how likely it is that the candidate would accept the offer. A candidate profile may be a profile of a hypothetical candidate (e.g., have a range of ages, education levels, and family status) that is generated using one or more models, or is created by a user. For example, the computer system may output two candidate profiles, each with its own score; a first candidate profile may be for a 20-29 year old, with an undergraduate computer science degree, and less than 2 years of experience, and a second candidate profile may be for a 40-49 year old with a master's degree in computer science and more than 10 years of experience. Using the models generated from the first set of bundled data, the computer system may determine that a candidate matching the first candidate profile would have an 80% chance of accepting an offer with a $40,000 annual salary, and that a candidate matching the second candidate profile would only have a 10% chance of accepting the same offer. In some embodiments, the computer system may return confidence intervals (e.g., between 5% and 15% chance the second candidate would accept the job) instead of, or in addition to, a score.

The computer system may generate the one or more models using the ingested first set of bundled data. The model may include a plurality of correlations between candidate information and operational information. The candidate information may include information pertaining to characteristics of a job applicant or candidate (e.g., age, education, family/marital status, geographic preferences, etc.). The operational information may include information pertaining to characters of the job or role (e.g., work-life balance, salary, numbers of hours worked, vacation days, benefits, upward mobility, etc.). In some embodiments, the operational information may include elective information (e.g., a candidate's desired salary) instead of, or in addition to, actual operational information (e.g., the actual salary).

The computer system may generate the model by identifying the correlations between candidate information and operational information, determining strength of the correlation, and weighting each correlation according to the determined strength. In some embodiments, the computer system may generate one or more models parameterized by the candidate information, and/or one or more models parametrized by the operational information. For example, a user could enter the candidate information of a particular job applicant and the computer system, using a model parameterized by the candidate information, could generate an offer package for that candidate (e.g., an offer that includes a specific salary) based on the candidates information (e.g., education level).

In some embodiments, a user may input a set of candidate information categories into the computer system (e.g., as a query). The computer system may identify, from a database, each correlation in a model associated with the set of candidate information. The computer system may then generate a tailored package to attract candidates based on the associated correlations.

In some embodiments, a user may input a set of candidate information categories into the computer system (e.g., as a query). In some embodiments, the set of candidate information categories may correspond to a particular candidate. The computer system may identify each correlation in a model associated with the set of candidate information categories. The computer system may generate a tailored offer for the particular candidate to accept based on the associated correlations.

For example, a user may input a query for 26-year-old portrait artist. The computer system may identify a model for a 26-year-old and a model for a portrait artist from a database (e.g., archive, memory, etc.). The computer system may then, using the models, generate a tailored offer for a 26-year-old portrait artist. The tailored offer generated by the computer system may suggest offering the 26-year-old portrait artist $200 an hour and paying for all supplies needed for the portrait. The offer may be generated by using past correlations, found in the models, that have resulted in portrait artists accepting a commission. The user may then use the tailored offer to have the best chances of retaining the artist.

In some embodiments, after generating the tailored offer, the computer system may identify if the particular candidate accepted the offer. The computer system may update, based on the offer acceptance (or rejection), the rankings of each correlation. The computer system may output an updated display of the updated, ranked correlations on the GUI.

Following the example above, the user may input into the computer system that the 26-year-old portrait artist did accept the tailored offer. The computer system may update the rankings used to generate the tailored offer because they lead to a correct acceptance prediction. The computer system may also output a display of the updated ranks to a user in order for the user to use the rankings to tailor another offer/package. In some embodiments, the candidate may reject the tailored offer and the rankings of the correlation may fall (e.g., the correlations used to generate the tailored offer may no longer be used to generate another offer).

In some embodiments, the computer system may receive, from a user (e.g., organization), information on what the user can offer to a candidate. The computer system may then be able to automatically create a job posting directed towards candidates likely to accept the candidate position based on the information. For example, a user may be searching for a personal chef and be willing to pay the chef $1,000 for an evening meal. The user may input into a computer system that he is searching for a chef that will cook for $1,000. The computer system may analyze a database for a model associated with personal chefs and a model associated with candidates accepting $1,000. The computer system may use the models to generate correlations (e.g., using a bipartite graph to find cross-correlations between the personal chef model and the $1,000 model) of what types of personal chefs work for $1000.

The computer system may determine, from the correlations, that a personal chef with culinary school training that has been out of culinary school for less than 5 years is most likely to work for $1,000. The computer system may generate a job posting advertising a $1,000 for a culinary school trained chef, with chefs with less than 5 years being in contention for the position. In some embodiments, the computer system may automatically post the job posting on a career-oriented webpage.

Figure 1:
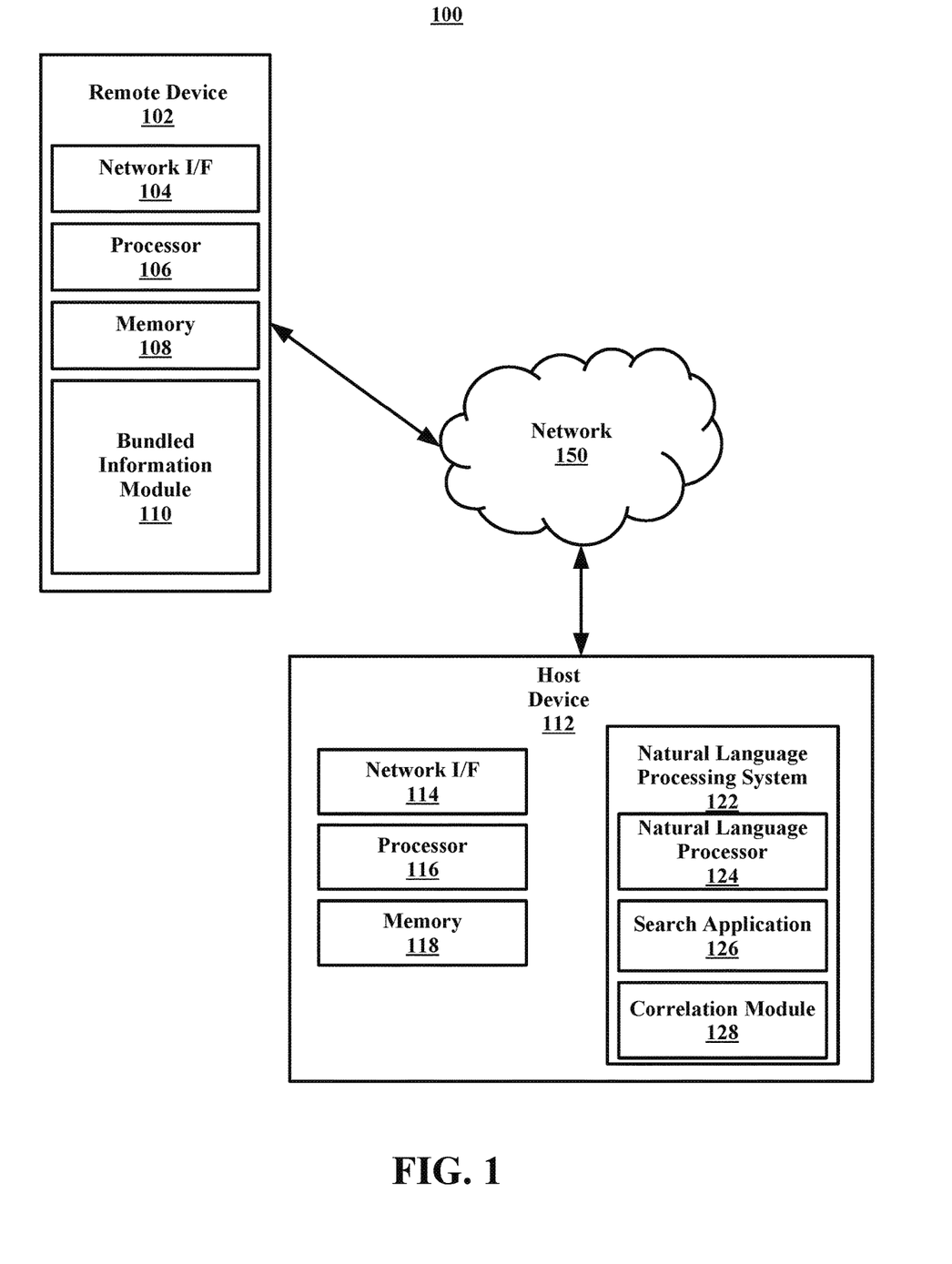
FIG. 1 illustrates a block diagram of an example computing environment in which illustrative embodiments of the present disclosure may be implemented.

As discussed above, aspects of the disclosure may relate to natural language processing. Accordingly, an understanding of the embodiments of the present disclosure may be aided by describing embodiments of natural language processing systems and the environments in which these systems may operate. Turning now to FIG. 1, which illustrates a block diagram of an example computing environment 100, according to embodiments of the present disclosure. In some embodiments, the computing environment 100 may include a remote device 102 and a host device 112.

Consistent with various embodiments, the remote device 102 and the host device 112 may be computer systems. The remote device 102 and the host device 112 may include one or more processors 106 and 116 and one or more memories 108 and 118, respectively. The remote device 102 and the host device 112 may be configured to communicate with each other through an internal or external network interface 104 and 114. The network interfaces 104 and 114 may be, e.g., modems or network interface cards. The remote device 102 and/or the host device 112 may be equipped with a display or monitor. Additionally, the remote device 102 and/or the host device 112 may include optional input devices (e.g., a keyboard, mouse, scanner, or other input device), and/or any commercially available or custom software (e.g., browser software, communications software, server software, natural language processing software, search engine and/or web crawling software, filter modules for filtering content based upon predefined parameters, etc.). The host device 112 may, in various embodiments, be connected to an output device. The output device includes any device that may be used to read, listen to, print out, or watch the training model. For example, the output device may be a tablet, an e-reader, or a printer. In some embodiments, the remote device 102 and/or the host device 112 may be servers, desktops, laptops, or hand-held devices.

The remote device 102 and the host device 112 may be distant from each other and communicate over a network 150. In some embodiments, the host device 112 may be a central hub from which remote device 102 can establish a communication connection, such as in a client-server networking model. Alternatively, the host device 112 and remote device 102 may be configured in any other suitable networking relationship (e.g., in a peer-to-peer configuration or using any other network topology).

In some embodiments, the network 150 can be implemented using any number of any suitable communications media. For example, the network 150 may be a wide area network (WAN), a local area network (LAN), an internet, or an intranet. In certain embodiments, the remote device 102 and the host device 112 may be local to each other, and communicate via any appropriate local communication medium. For example, the remote device 102 and the host device 112 may communicate using a local area network (LAN), one or more hardwire connections, a wireless link or router, or an intranet. In some embodiments, the remote device 102 and the host device 112 may be communicatively coupled using a combination of one or more networks and/or one or more local connections. For example, the remote device 102 may be a first remote device hardwired to the host device 112 (e.g., connected with an Ethernet cable) while a second remote device (not shown) may communicate with the host device using the network 150 (e.g., over the Internet).

In some embodiments, the network 150 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 150.

In some embodiments, the remote device 102 may enable users to submit (or may submit automatically with or without user input) bundled information to the host device 112 in order to generate a correlation between one or more categories of operational information and candidate information. For example, the remote device 102 may include bundled information module 110 and a user interface (UI). The bundled information module 110 may be in the form of a web browser or any other suitable software module, and the UI may be any type of interface (e.g., command line prompts, menu screens, graphical user interfaces). The UI may allow a user to interact with the remote device 102 to submit, using the bundled information module 110, one or more sets of bundled information (that may include operational and/or candidate information) to the host device 112. In some embodiments, the bundled information module 110 may be split into two or more modules. The two or more modules may be respectively for sets of operational information categories or sets of candidate information categories. For example, a user can submit a set of candidate information categories using the bundled information module 110, and receive, from the host device 112, an offer tailored associated with the submitted set of candidate information categories. As another example, the user may submit sets of candidate information categories and an offer package (e.g. how what the user can offer to a candidate) to the host device 112 using the bundled information module 110. The user may then receive back a score indicating the likeness of the candidate accepting the offer package.

In some embodiments, a user may scan physical documents containing bundled information into the remote device (or the host device). The remote device (or host device) may then perform optical character recognition on the scanned documents to convert the document to machine-encoded text. The machine-encoded text may, if necessary, be transmitted to the host device using the bundled information module 110 and the user interface.

In some embodiments, the host device 112 may include a natural language processing system 122. The natural language processing system 122 may include a natural language processor 124, a search application 126, and a correlation module 128. The natural language processor 124 may include numerous subcomponents, such as a tokenizer, a part-of-speech (POS) tagger, a semantic relationship identifier, and a syntactic relationship identifier. An example natural language processor is discussed in more detail in reference to FIG. 2.

The search application 126 may be implemented using a conventional or other search engine, and may be distributed across multiple computer systems. The search application 126 may be configured to search one or more databases or other computer systems for content that is related to bundled information (such as a salary, work schedule, age of candidates, if the candidates have children, etc.) submitted by a remote device 102. For example, the search application 126 may be configured to search a corpus (or universe) of operational information categories and candidate information categories related to the received bundled information to identify relationships (e.g., correlations, models, etc.) between the sets of operational information categories and sets of candidate information categories and other prior correlations and/or models. The correlation module 128 may be configured to analyze a set of bundled information to determine which categories of operational information and which categories of candidate information may relate to each other. The correlation module 128 may include one or more modules or units, and may utilize the search application 126, to perform its functions (e.g., to determine correlations between sets of operational information categories and sets of candidate information categories, and generate one or more models), as discussed in more detail in reference to FIG. 2.

While FIG. 1 illustrates a computing environment 100 with a single host device 112 and a single remote device 102, suitable computing environments for implementing embodiments of this disclosure may include any number of remote devices and host devices. The various modules, systems, and components illustrated in FIG. 1 may exist, if at all, across a plurality of host devices and remote devices. For example, some embodiments may include two host devices. The two host devices may be communicatively coupled using any suitable communications connection (e.g., using a WAN, a LAN, a wired connection, an intranet, or the Internet). In some embodiments, the first host device may include a natural language processing system configured to generate a bipartite graph (e.g., a knowledge graph) for obtained bundled information, and the second host device may include a software module configured to generate a model for a correlation.

For example, the first host device may receive a candidate exit interview in the form of a video (e.g., unstructured data). The natural language processing system included in the first host device may parse the video and structure, into categories, the words spoken by the candidate (e.g., the system may correlate words to respective categories about pay, work-life balance, etc.). The natural language processing system may generate a bipartite graph using the categories and generate models associated with the correlations found (e.g., a model may be generated for attorneys that may have a correlation supporting that more pay is needed for less work-life balance, etc.).

It is noted that FIG. 1 is intended to depict the representative major components of an exemplary computing environment 100. In some embodiments, however, individual components may have greater or lesser complexity than as represented in FIG. 1, components other than or in addition to those shown in FIG. 1 may be present, and the number, type, and configuration of such components may vary.

Figure 2:
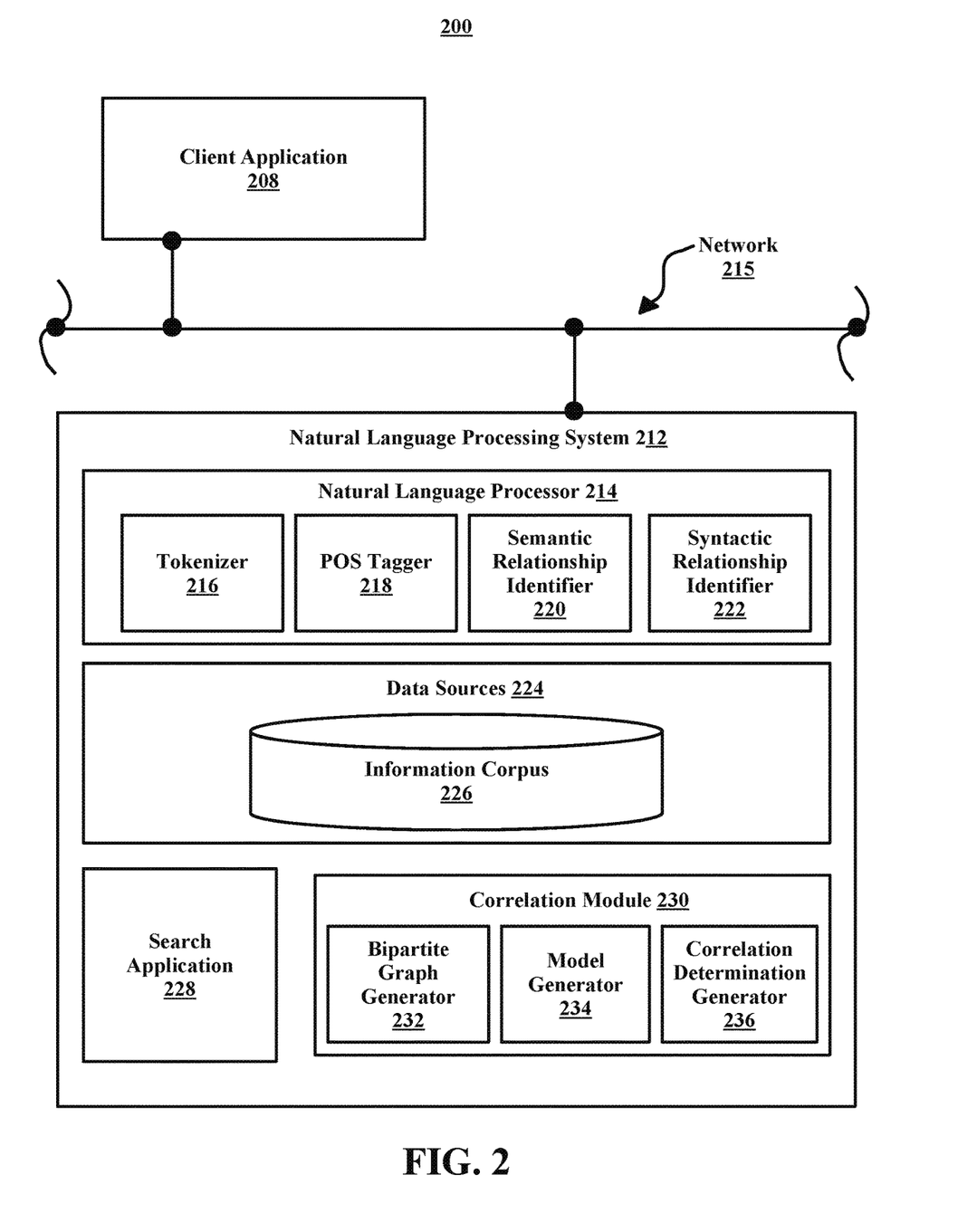
FIG. 2 illustrates a block diagram of an example natural language processing system, in accordance with embodiments of the present disclosure.

Referring now to FIG. 2, shown is a block diagram of an exemplary system architecture 200, including a natural language processing system 212, configured to analyze a set of bundled information in order to determine a correlation, in accordance with embodiments of the present disclosure. In some embodiments, a remote device (such as remote device 102 of FIG. 1) may submit electronic information (such as a candidate survey) to be analyzed by the natural language processing system 212 which may be housed on a host device (such as host device 112 of FIG. 1). Such a remote device may include a client application 208, which may itself involve one or more entities operable to generate or modify bundled information that may then be dispatched to a natural language processing system 212 via a network 215.

Consistent with various embodiments, the natural language processing system 212 may respond to bundled information submissions (e.g., in the form of electronic documents, etc.) sent by the client application 208. Specifically, the natural language processing system 212 may analyze a set of bundled information to identify related information (e.g., associated words, concepts, etc. may be searched in a database, the Internet, etc.) and generate a correlation between related information (e.g., operational information, candidate information, etc.). In some embodiments, the natural language processing system 212 may include a natural language processor 214, data sources 224, a search application 228, and a correlation module 230. The natural language processor 214 may be a computer module that analyzes the obtained bundled information. The natural language processor 214 may perform various methods and techniques for analyzing the bundled information (e.g., syntactic analysis, semantic analysis, etc.). The natural language processor 214 may be configured to recognize and analyze any number of natural languages. In some embodiments, the natural language processor 214 may parse the sets of bundled information (e.g., may parse passages of a set of documents, etc.) into one or more categories of operational and candidate information. Further, the natural language processor 214 may include various modules to perform analyses of operational information and/or candidate information in the form of electronic documents. These modules may include, but are not limited to, a tokenizer 216, a part-of-speech (POS) tagger 218, a semantic relationship identifier 220, and a syntactic relationship identifier 222. In some embodiments, an electronic document may be a candidate survey, a video of a candidate interview, a video of a candidate exit interview, a transcript of a candidate interview, labor statistics from government agencies, statistics from a particular work industry, statistics from schools, information from blog posts, information from social media websites, information from professional websites, etc.

In some embodiments, the tokenizer 216 may be a computer module that performs lexical analysis. The tokenizer 216 may convert a sequence of characters into a sequence of tokens. A token may be a string of characters included in an electronic document and categorized as a meaningful symbol. Further, in some embodiments, the tokenizer 216 may identify word boundaries in an electronic document and break any text passages within the document into their component text elements, such as words, multiword tokens, numbers, and punctuation marks. In some embodiments, the tokenizer 216 may receive a string of characters, identify the lexemes in the string, and categorize them into tokens (e.g., generate one or more sets of operational information categories and/or one or more sets of candidate information categories from the bundled information).

Consistent with various embodiments, the POS tagger 218 may be a computer module that marks up a word in passages to correspond to a particular part of speech. The POS tagger 218 may read a passage or other text in natural language and assign a part of speech to each word or other token. The POS tagger 218 may determine the part of speech to which a word (or other text element) corresponds based on the definition of the word and the context of the word. The context of a word may be based on its relationship with adjacent and related words in a phrase, sentence, or paragraph. In some embodiments, the context of a word may be dependent on one or more previously analyzed electronic documents (e.g., the content of the first set of bundled information may shed light on the meaning of text elements in the second set of bundled information, particularly if they are part of the same corpus or universe). Examples of parts of speech that may be assigned to words include, but are not limited to, nouns, verbs, adjectives, adverbs, and the like. Examples of other part of speech categories that POS tagger 218 may assign include, but are not limited to, comparative or superlative adverbs, wh-adverbs, conjunctions, determiners, negative particles, possessive markers, prepositions, wh-pronouns, and the like. In some embodiments, the POS tagger 218 may tag or otherwise annotate tokens of a passage with part of speech categories. In some embodiments, the POS tagger 218 may tag tokens or words of a passage to be parsed by the natural language processing system 212.

In some embodiments, the semantic relationship identifier 220 may be a computer module that may be configured to identify semantic relationships of recognized text elements (e.g., words, phrases) in electronic documents. In some embodiments, the semantic relationship identifier 220 may determine functional dependencies between entities and other semantic relationships.

Consistent with various embodiments, the syntactic relationship identifier 222 may be a computer module that may be configured to identify syntactic relationships in a set of operational information and or candidate information composed of tokens. The syntactic relationship identifier 222 may determine the grammatical structure of sentences such as, for example, which groups of words are associated as phrases and which word is the subject or object of a verb. The syntactic relationship identifier 222 may conform to formal grammar.

In some embodiments, the natural language processor 214 may be a computer module that may parse a set of bundled information and generate corresponding data structures (e.g., a database table of categories) for one or more portions of the parsed set of bundled information. For example, in response to receiving a written candidate survey at the natural language processing system 212, the natural language processor 214 may output parsed text elements from the written candidate survey as data structures. In some embodiments, a parsed text element may be represented in the form of a parse tree or other graph structure. To generate the parsed text element, the natural language processor 214 may trigger computer modules 216-222.

In some embodiments, the output of the natural language processor 214 may be stored as an information corpus 226 in one or more data sources 224. In some embodiments, data sources 224 may include data warehouses, information corpora, data models, and document repositories. The information corpus 226 may enable data storage and retrieval. In some embodiments, the information corpus 226 may be a storage mechanism that houses a standardized, consistent, clean, and integrated copy of the ingested and parsed bundled information. The information corpus 226 may also include a list of correlations found in the ingested bundled information. The data may be sourced from various operational systems. Data stored in the information corpus 226 may be structured in a way to specifically address analytic requirements. For example, the information corpus 226 may store the ingested bundled information as a plurality of categories to make bipartite graph generation easier. In some embodiments, the information corpus 226 may be a relational database.

In some embodiments, the natural language processing system 212 may include a correlation module 230. The correlation module 230 may be a computer module that is configured to generate a bipartite graph and a model for a correlation between candidate information and operational information, rank which correlations are considered most likely to attract or retain a candidate, and output correlations in the form of the model. In some embodiments, the correlation module 230 may contain submodules. For example, the correlation module 230 may contain a bipartite graph generator 232, a model generator 234, and a correlation determination generator 236. The bipartite graph generator 232 may be configured to parse a set of obtained bundled information using the natural language processor 214 and related subcomponents 216-222. The bipartite graph generator 232 may then generate, from the parsed bundled information, a bipartite graph consisting of a plurality of nodes (each relating to a different category) and edges. In some embodiments, the bipartite graph generator 232 may use a search application 228 to search a set of (i.e., one or more) corpora (e.g., data sources 224) to identify the categories and relationships between the categories to generate a bipartite graph.

The model generator 234 may be configured to identify a correlation and generate a model for the correlation. In some embodiments, the model generator 234 may prompt a user to select the correlation from, e.g., a list of correlations that appear between the set of operational and set of candidate information categories parsed from the set of bundled information. The model generator 234 may break the ingested bundled information into sets of operational categories and sets of candidate information categories using the natural language processor 214 and related subcomponents 216-222. The model generator 234 may then search the categories using, e.g., a search application 228 to identify which categories contain the correlation and which correlations do not in order to generate an associated model.

The correlation determination generator 236 may be a computer module that is configured to determine which correlations identified by the model generation 234 are to be displayed in a model to a user. The correlation determination generator 236 may receive, from the model generator 234, a list of ranked correlations which detail the candidate expectations that are most likely to lead to candidate acceptance and/or retention. The correlation determination generator 236 may also determine, using the bipartite graph, which categories of the bundled information are intricately related (e.g., which operational and candidate information categories may be correlated).

Figure 3:
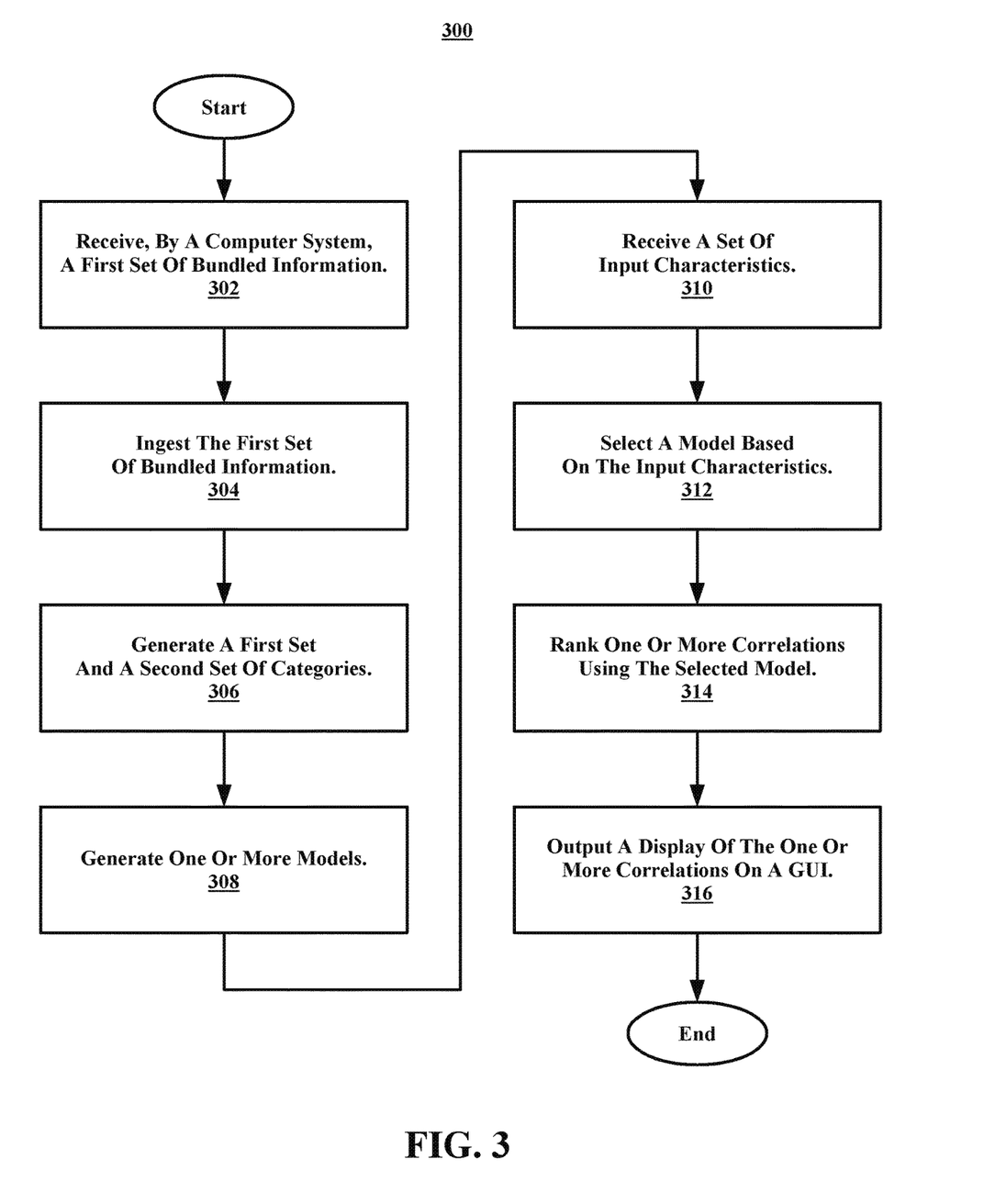
FIG. 3 illustrates a flowchart of an example method for outputting a display of one or more correlations using a model, in accordance with embodiments of the present disclosure.

Referring now to FIG. 3, which illustrates a flowchart of an example method 300 for outputting a display of one or more correlations using a model, in accordance with embodiments of the present disclosure. A computer system may perform one or more operations in the method 300. In some embodiments, a user may perform one or more operations in the method 300.

In some embodiments, the processor may perform one or more operations in the method 300 in response to user input. In some embodiments, the method 300 may begin at operation 302 where a computer system may receive a first set of bundled information. In some embodiments, the computer system may include a process and a memory storing one or more natural language processing modules. In some embodiments, the first set of bundled information may be information gathered from labor statistics, housing statistics, employee surveys, social media posts, etc.

In some embodiments, after receiving a first set of bundled information at operation 302, the method 300 may proceed to operation 304. At operation 304, the computer system, using a natural language processing module, may ingest the first set of bundled information. After ingesting the first set of bundled information at operation 304, the method 300 may proceed to operation 306. At operation 306, the computer system may generate a first set and a second set of categories. In some embodiments, the first set of categories may be operational information categories (e.g., salary, office space given to candidates, etc.) and the second set of categories may be candidate information categories (e.g., education level, social life, etc.).

After generating a first set and a second set of categories at operation 306, the method 300 may proceed to operation 308. At operation 308, the computer system may generate one or more models. In some embodiments, the models may be associated to the first set and the second set of categories. For example, the computer system may receive a social-media post (e.g., first set of bundled information) stating "Doug, the car salesman, loves his job when he makes $5,000 in commission in one day." The computer system may ingest the social-media post and generate a first set of categories associated to Doug (e.g., candidate information categories). The first set of categories may include the category of "car salesman."

Additionally, the computer system may generate a second set of categories associated with the organization Doug currently works at (e.g., operational information categories). The second set of categories may include the category of "commissions." The computer system may then generate a model that associates Doug and Commissions. In some embodiments, the computer system may be able to infer operational information and candidate information. For example, the computer system may infer from Doug being a car salesman that he works at a car dealership (e.g., operational information).

After generating one or more models at operation 308, the method 300 may proceed to operation 310. At operation 310, the computer system may receive a set of input characteristics. In some embodiments, a user may input the set of input characteristics into the computer system. In some embodiments, the set of input characteristics may be a query by a user. In some embodiments, the set of input characteristics may be candidate information and/or operational information. For example, a user may input into the computer system that the user is searching for a candidate who is a mechanical engineer (e.g., candidate information) and will accept a $50,000 salary (e.g., operational information).

After receiving a set of input characteristics at operation 310, the method 300 may proceed to operation 312. At operation 312 the computer system may select a model based on the input characteristics. After selecting a model based on the input characteristics at operation 312, the method 300 may proceed to operation 314. At operation 314 the computer system may rank one or more correlations using the selected model.

After ranking the one or more correlations using the selected model at operation 314, the method 300 may proceed to operation 316. At operation 316, the computer system may output a display of the one or more correlations on a graphical user interface. In some embodiments, the display may be a graph, a pie chart, a bar graph, a heat map, a list, etc.

Following the example above, the computer system may search a database for a model that contains both the categories of a mechanical engineer and a salary of $50,000. The computer system may select this model and identify the correlations in the model, as being that a mid-level mechanical engineer is most likely to expect a salary of $50,000 and that a senior mechanical engineer is least likely to expect a salary of $50,000. The computer system may rank the mid-level mechanical engineer correlation above the senior mechanical engineer correlation because the computer system may be programmed to display to the user the correlation most likely to help the user attract a candidate likely to accept an offer. The computer system may then display, on computer monitor, the ranked correlations to the user as a ranked list with the mid-level mechanical engineer correlation listed first. In some embodiments, the computer system may use the input characteristics as maximum search values. For example, the computer system may search for any correlations between mechanical engineers and salaries less than or equal to $50,000.

Figure 4:
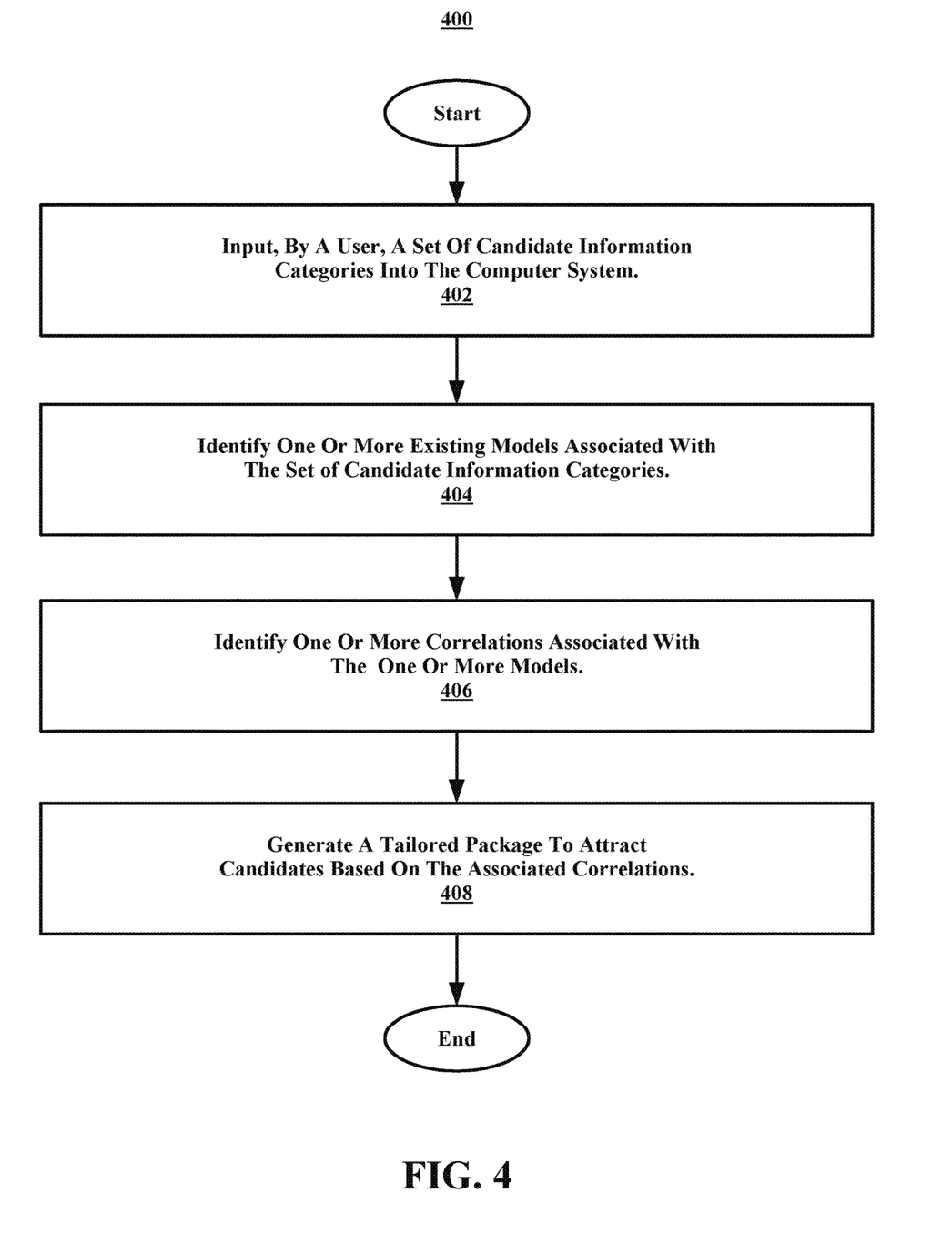
FIG. 4 illustrates a flowchart of an example method for tailoring a package to attract candidates, in accordance with embodiments of the present disclosure.

Referring now to FIG. 4, illustrated is a flowchart of an example method 400, in accordance with embodiments of the present disclosure. A computer system may perform one or more operations in the method 400. In some embodiments, a user may perform one or more operations in the method 400. In some embodiments, the processor may perform one or more operations in the method 400 in response to user input. In some embodiments, the method 400 may begin at operation 402 where a user may input a set of candidate information into the computer system. In some embodiments, the set of candidate information may be inputted as a query.

After the user has input a set of candidate information at operation 402, the method 400 may proceed to operation 404. At operation 404, the computer system may identify one or more existing models associated with the set of candidate information. After the computer system has identified one or more existing models associated with the set of candidate information at operation 404, the method 400 may proceed to operation 406. At operation 406, the computer system may identify one or more correlations associated with the one or more models.

After identifying one or more correlations associated with the one or more models at operation 406, the method 400 may proceed to operation 408. At operation 408, the computer system may generate a tailored package to attract candidates based on the associated correlations.

For example, a user may be looking for a mid-level attorney from a second-tier law school. The user may input the phrase "mid-level attorney and second-tier law school" (e.g., a set of candidate information categories) into the computer system. The computer system may search a database (e.g., memory, repository, bank, etc.) for each model associated with the inputted phrase. The computer system may identify a model for mid-level attorneys, second-tier law schools, and mid-level attorneys from second-tier law schools (e.g., the computer system may identify individual models for each candidate information category and/or combinations of each candidate information category).

The computer system may select the combined mid-level attorneys from second-tier law schools because it most closely matches the query. The computer system may then identify a correlation, from the selected model, that mid-level attorneys from second-tier law schools accept, 55% of the time, offers with $70,000 a year salaries, no medical benefits, and 10 days of paid vacation a year. The computer system may also identify the correlation of mid-level attorneys from second-tier law schools accepting, 98% of the time, offers with $100,000 salaries, no medical benefits, and 6 days of paid vacation a year. The computer system, using the correlations may generate a tailored packed that suggests that the user place an offer with a $80,000 a year salary, half-medical benefits paid, and 8 days of paid vacation to attract mid-level attorneys from second-tier law schools (e.g., as it may be expected by the mid-level attorney to receive a salary above $70,000 with some benefits and some paid vacation).

In some embodiments, the computer system may determine all subcategories that fall under the broad query category. For example, when searching for "mid-level attorneys" the computer system may search for all candidates who have between three and five years experience as attorneys. That is "mid-level" is the broad query category and it is subcategorized into three, four, and five years of experience.

Figure 5:
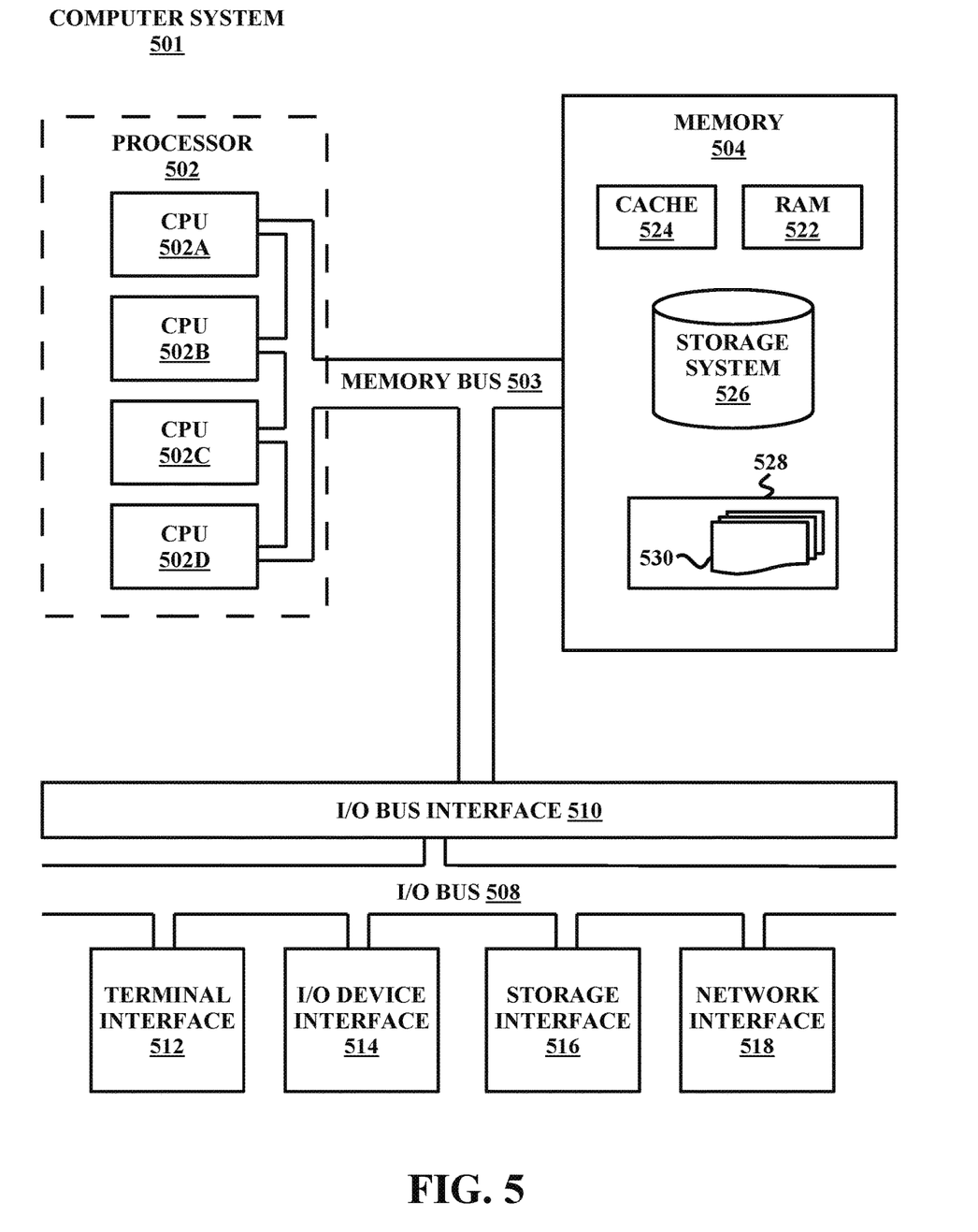
FIG. 5 illustrates a high-level block diagram of an example computer system that may be used in implementing one or more of the methods, tools, and modules, and any related functions, described herein, in accordance with embodiments of the present disclosure.

Referring now to FIG. 5, shown is a high-level block diagram of an example computer system 501 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

System memory 504 may include computer system readable media in the form of volatile memory, such as random access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method comprising, using a processor of a computer system:

receiving, by a computer system via a network interface, a first set of bundled job related information FSBJRI, the computer system having a memory storing one or more natural language processing modules, wherein the memory and the network interface are in communication with the processor;

ingesting, using a natural language processing module of the one or more natural language processing modules, the FSBJRI;

determining, based on the FSBJRI, to combine data from one or more disparate information sources that comprise a first information source and a second information source associated with the FSBJRI, and wherein the first information source is disparate from the second information source;

generating an operational information category and a candidate information category;

segregating the FSBJRI into the operational information category and the candidate information category to produce and store, in the memory, operational information and candidate information respectively;

generating one or more models by adding the segregated and stored operational information category and the candidate information category to a bipartite graph;

updating one or more models based on the FSBJRI;

receiving a set of entity input characteristics for use in a candidate query via the network interface;

predicting an outcome, wherein the prediction comprises generating an inference from combined information from the combined information from the disparate information sources;

determining one or more correlations between the operational information and the candidate information;

selecting a model based on the candidate input characteristics;

ranking the one or more correlations using the selected model; and outputting a display of the one or more correlations on a graphical user interface (GUI), wherein outputting the display of the one or more correlations on the GUI comprises generating an indicator that indicates a strength of the one or more correlations as they relate to the candidate input characteristics;

determining a past acceptance correlation between past candidate acceptance and the one or more models that have resulted in acceptance;

responsive to receipt of the set of entity input characteristics, generate a tailored job-related package for presentation to a selected candidate based on the past acceptance correlation, wherein the generating comprises combining information from the operational information category and candidate information category and outputting the combined information to a user-accessible media for viewing;

provide the tailored job-related information to the selected entity as an electronic transmission via the network interface;

receive, via the network interface and responsive to the provision of the tailored job-related information, a selected candidate response selected from the group consisting of acceptance and rejection of the job-related package; and update a ranking based on the selected candidate response;

wherein:

the FSBJRI is unstructured;

the generating of the operational information category and the candidate information category comprises:

structuring the operational information and the candidate information in a bipartite graph; and the generating of the one or more models comprises:

identifying, using the bipartite graph, the one or more correlations between the operational information category and the candidate information category; and generating a first model that includes at least one of the one or more correlations.

2. The computer-implemented method of claim 1, wherein generating one or more models comprises:

adding the operational information and candidate information categories to a bipartite graph;

identifying, using the bipartite graph, the one or more correlations between the operational information and candidate information categories; and generating a first model that includes at least one of the one or more correlations.

3. The computer-implemented method of claim 1, wherein the input characteristics are a second set of bundled information, and wherein receiving the set of input characteristics comprises:

receiving the second set of bundled information, wherein the second set of bundled information includes a set of operational information categories and a set of candidate information categories; and combining the second set of bundled information with the first set of bundled information.

4. The computer-implemented method of claim 1, wherein selecting the model based on the input characteristics comprises:

generating, from the input characteristics, a third set and a fourth set of categories; and determining whether at least one category of the operational information and candidate information categories matches at least one category of the third and fourth set of categories.

5. The computer-implemented method of claim 1, wherein outputting the display of the one or more correlations on the GUI comprises:

generating a bar graph that indicates the strength of the one or more correlations as they relate to the input characteristics.

6. The computer-implemented method of claim 1, wherein outputting the display of the one or more correlations on the GUI comprises:

generating a heat map that indicates the strength of the one or more correlations as they relate to the input characteristics.

* * * * *